United States Patent
Meulle et al.

(10) Patent No.: US 11,823,582 B2
(45) Date of Patent: Nov. 21, 2023

(54) OPTIMIZING A PARAMETRIC MODEL OF AIRCRAFT PERFORMANCE

(71) Applicant: THALES, Courbevoie (FR)

(72) Inventors: Guillaume Meulle, Tournefeuille (FR); Christophe Pierre, Fontenilles (FR); Dorian Martinez, Toulouse (FR)

(73) Assignee: THALES, Courbevoie (FR)

( * ) Notice: Subject to any disclaimer, the term of this patent is extended or adjusted under 35 U.S.C. 154(b) by 277 days.

(21) Appl. No.: 16/716,198

(22) Filed: Dec. 16, 2019

(65) Prior Publication Data
US 2020/0202725 A1    Jun. 25, 2020

(30) Foreign Application Priority Data

Dec. 20, 2018  (FR) ...................................... 1873496

(51) Int. Cl.
| | |
|---|---|
| *G08G 5/00* | (2006.01) |
| *B64D 45/00* | (2006.01) |
| *G05D 1/10* | (2006.01) |
| *G06F 17/17* | (2006.01) |
| *G01C 21/20* | (2006.01) |

(52) U.S. Cl.
CPC ........... *G08G 5/0047* (2013.01); *B64D 45/00* (2013.01); *G01C 21/20* (2013.01); *G05D 1/101* (2013.01); *G06F 17/17* (2013.01); *G08G 5/0052* (2013.01); *B64D 2045/0075* (2013.01)

(58) Field of Classification Search
CPC ...................................................... G06F 17/17
See application file for complete search history.

(56) References Cited

U.S. PATENT DOCUMENTS

| | | | |
|---|---|---|---|
| 5,070,458 A * | 12/1991 | Gilmore ............... | G05D 1/0005 702/182 |
| 9,290,262 B2 | 3/2016 | Laso-Leon et al. | |
| 9,296,474 B1 * | 3/2016 | Nguyen ............... | G05B 13/048 |
| 2005/0096873 A1 * | 5/2005 | Klein ..................... | G01H 1/006 702/184 |
| 2011/0208374 A1 * | 8/2011 | Jayathirtha .......... | G01C 23/005 701/4 |
| 2014/0207429 A1 | 7/2014 | Spira et al. | |

(Continued)

FOREIGN PATENT DOCUMENTS

| | | | |
|---|---|---|---|
| WO | WO-2015196259 A1 * | 12/2015 | ........... G06Q 10/047 |
| WO | 2017/042166 A1 | 3/2017 | |

(Continued)

*Primary Examiner* — Christian Chace
*Assistant Examiner* — Shayne M. Gilbertson
(74) *Attorney, Agent, or Firm* — BakerHostetler

(57) ABSTRACT

Methods and systems for optimizing the flight of an aircraft are disclosed. The trajectory is divided into segments, each of the segments being governed by distinct sets of equations, depending on engine thrust mode and on vertical guidance (climb, cruise or descent). By assuming two, aerodynamic and engine-speed, models, data from flight recordings are received and a number of parameters from a parameter-optimization engine is iteratively determined by applying a least-squares calculation until a predefined minimality criterion is satisfied. The parameter optimization engine is next used to predict the trajectory point following a given point. Software aspects and system (e.g. FMS and/or EFB) aspects are described.

10 Claims, 2 Drawing Sheets

(56) References Cited

U.S. PATENT DOCUMENTS

| | | | | |
|---|---|---|---|---|
| 2015/0239582 A1* | 8/2015 | Claggett | ............... | F02D 41/221 |
| | | | | 701/13 |
| 2016/0019795 A1* | 1/2016 | Chircop | ............... | G08G 5/0078 |
| | | | | 701/3 |
| 2016/0238481 A1* | 8/2016 | Brandon | ................. | G06F 30/15 |
| 2018/0286254 A1* | 10/2018 | Westervelt | ........... | G08G 5/0039 |
| 2018/0314776 A1* | 11/2018 | Gallo | ..................... | G07C 5/085 |

FOREIGN PATENT DOCUMENTS

| | | | | |
|---|---|---|---|---|
| WO | WO-2017042166 A1 * | 3/2017 | ............. | G01C 21/20 |
| WO | WO-2017162197 A1 * | 9/2017 | ............. | B64C 19/02 |

\* cited by examiner

OPTIMIZING A PARAMETRIC MODEL OF AIRCRAFT PERFORMANCE

CROSS-REFERENCE TO RELATED APPLICATIONS

This application claims priority to foreign French patent application No. FR 1873496, filed on Dec. 20, 2018, the disclosure of which is incorporated by reference in its entirety.

FIELD OF THE INVENTION

The invention relates to the field of avionics in general. In particular, the invention relates to methods and systems for optimizing all or some of the operations of an aircraft.

BACKGROUND

The approaches known from the prior art (e.g. WO 2017042166 or U.S. Pat. No. 9,290,262) are generally based on a dataset modelling the performance of said aircraft. These performance data, although known to aircraft manufacturers, are not generally made public, which presents a considerable barrier to the development of methods for optimizing aircraft operations.

Additionally, when they are disclosed, these data describe the behaviour of an aircraft type (generically) rather than that of a particular aircraft (i.e. the data are not specific). Lastly, aircraft models might not be royalty-free.

Where appropriate, producers of systems for optimizing aircraft operations must use the performance data provided by aircraft manufacturers (where appropriate) and therefore find themselves in a disadvantageous situation of dependency.

In the current prior art, certain tools such as "BADA" (acronym for "Base of Aircraft Data") or "Safety-Line" by EUCASS ("European Conference for Aeronautics and Space Sciences") have limitations. The BADA model is limited in terms of thrust and drag. The EUCASS model is applicable only to aircraft propelled by turbojets (N1-driven).

Current optimizations use various techniques. In particular, some approaches favour non-linear parameter-estimation methods (for example least-squares methods). These techniques are based on gradient-descent algorithms which have the drawback of sometimes converging on local minima, which leads to a poor estimate of model parameters.

Technical problems in aeronautics generally involve many different parameters and thus non-linear parametric methods converge little, poorly or do not converge at all. This lack of convergence (or of convergence towards local minima) is specifically often observed when the processes being modelled are of large scale (and follow different models depending on viewpoint).

The methods based on models incorporating physical equations of the aircraft are generally dependent on the quality of the modelling and on knowledge of the actual behaviour of the aircraft. In fact, these methods are generally not robust when faced with variability in the actual behaviour of a given aircraft in comparison with that of an "average" (modelled) aircraft.

There is an industrial need for advanced methods and systems for optimizing all or some of the operations of an aircraft.

SUMMARY OF THE INVENTION

Methods and systems for optimizing the flight of an aircraft are disclosed. The trajectory is divided into segments, each of the segments being governed by distinct sets of equations, depending on engine thrust mode and on vertical guidance (climb, cruise or descent). By assuming two, aerodynamic and engine-speed, models, data from flight recordings are received and a number of parameters from a parameter-optimization engine is iteratively determined by applying a least-squares calculation until a predefined minimality criterion is satisfied. The parameter optimization engine is next used to predict the trajectory point following a given point. Software aspects and system (e.g. FMS and/or EFB) aspects are described.

Advantageously, the method according to the invention is based on a thrust (and drag) model that is closer to reality than that implemented in the BADA model.

Advantageously, the invention makes it possible to determine a performance model for an aircraft, independently of its manufacturer.

Advantageously, the invention makes it possible to ensure the convergence of a least-squares estimation method on a large-scale hybrid multi-model problem.

The invention could advantageously be implemented in various avionic professions, and in particular in systems for assisting in the piloting of an aircraft.

In particular, the invention may be deployed in a computer such as an FMS or in a system assembly interconnecting the FMS with an EFB. More specifically, the potential applications relate to calculating trajectories, assisting an aircraft manufacturer in establishing aircraft performance, optimizing flight operations for an airline, flight simulation or adjusting avionic systems in a broader sense.

BRIEF DESCRIPTION OF THE DRAWINGS

Various aspects and advantages of the invention will appear in support of the description of one preferred, but nonlimiting, mode of implementation of the invention, with reference to the figures below.

DETAILED DESCRIPTION

Figure 1:
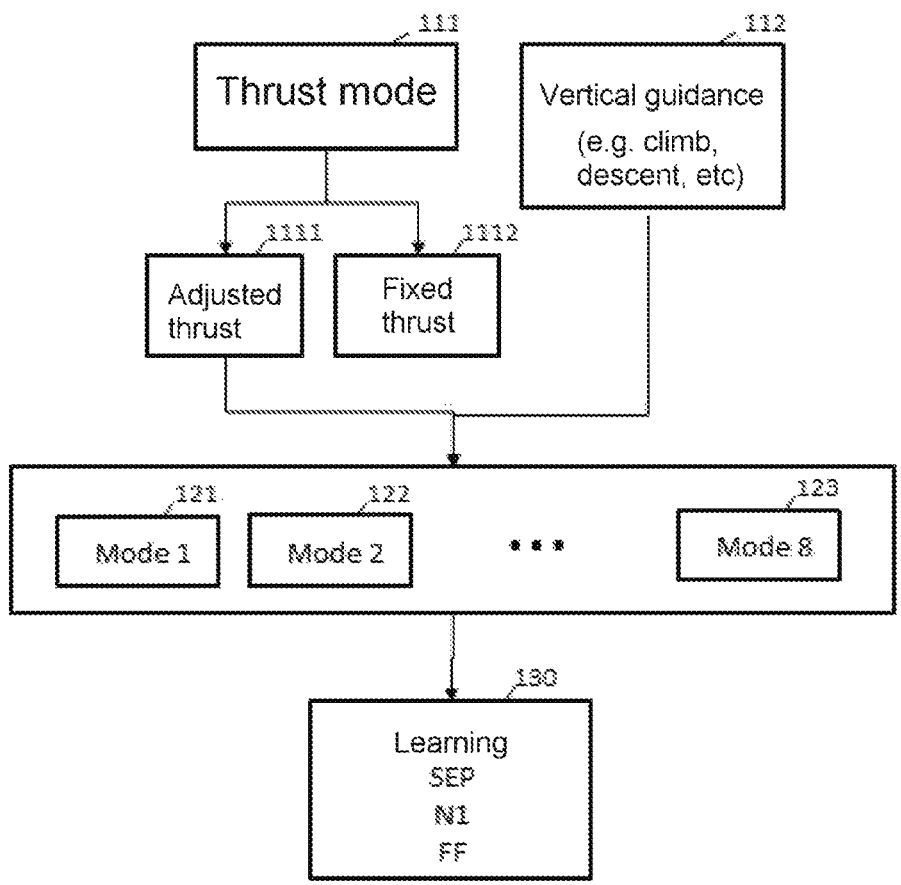
FIG. 1 illustrates examples of steps of the method according to one embodiment of the invention.

FIG. 1 illustrates the influence of thrust mode and vertical guidance on the parameters SEP, FF et N1.

The acronym SEP 111, for "specific excess power", refers to the energy available for the aircraft to climb, i.e. the climb capacity of the aircraft divided by weight (this parameter is not constant).

The acronym FF, for "fuel flow", refers to the variation in fuel weight.

The acronym N1 refers to the speed of rotation of the first stage of the engine, which is the one that has the greatest effect on fuel consumption. Available power is strongly related to this speed N1.

The parameters SEP, FF and N1 are closely related.

One way of quantifying or qualifying the relationships between SEP, FF and N1 consists in formulating models (equations) modelling these relationships.

There are multiple relationships between the parameters FF, N1 and SEP but they mainly depend on the aircraft flight mode, which is broken down into "thrust mode" (THR for "thrust" 111) on the one hand (whether adjusted 1111 or fixed 1111) and into "vertical guidance" 112 on the other hand (e.g. climb, cruise or descent).

These thrust and vertical-guidance modes define N flight modes (121, 122, . . . , 123) for the engine which are used in production (these are the autopilot modes e.g. modes referred to as open accel, IDLE, "energy sharing", engine idling, with or without airbrake deployment, etc.). For example an "open-accel" mode corresponds to full thrust in order to reach and maintain predefined target parameters. These Nt modes correspond to the same number of models or sets of equations.

Each mode therefore leads to a way of predicting 130 the next trajectory point (on the basis of a mode).

Figure 2:
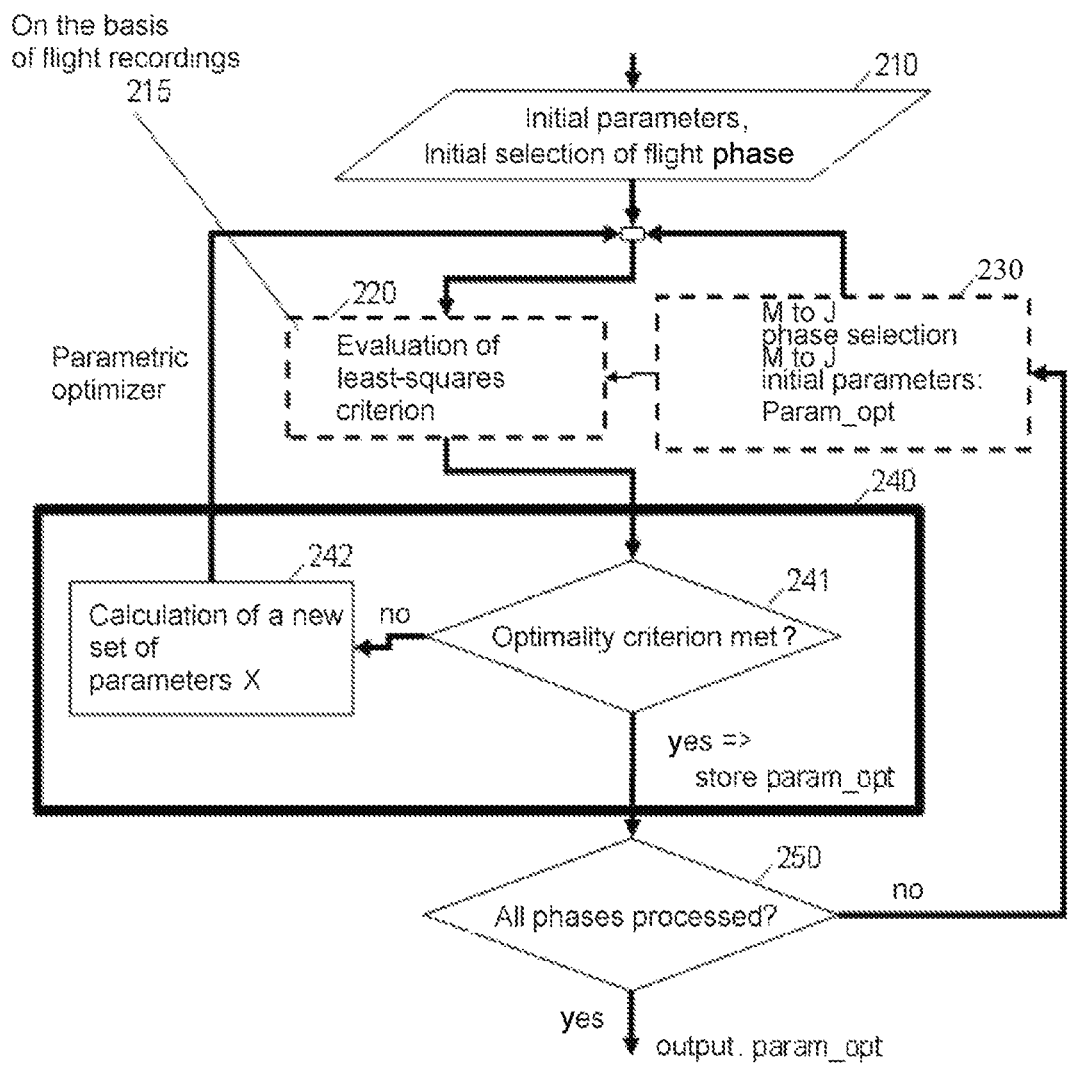
FIG. 2 illustrates one example of parameter optimization.

FIG. 2 illustrates examples of steps of the method according to the invention.

In one embodiment, the method comprises the step of determining a parametric model comprising a plurality of flight phases describing the flight mechanism of the aircraft, on the basis of recordings obtained during (real) commercial flights.

In one embodiment, the parametric model is determined using the method of least squares. The method of least squares makes it possible to compare experimental data, which is generally sullied by measurement errors, with a mathematical model that is intended to describe these data. The error model is generally Gaussian (normal law). If the error model is non-Gaussian, the method may use the maximum-likelihood method (of which the method of least squares is a particular case).

In one embodiment, the parametric model is determined using the method of recursive least squares (RLS), which is an adaptive filter (minimizing an error function or the weighted least squares).

In one embodiment, the parametric model is determined using the method of two-stage least squares. This estimator makes it possible in particular to estimate a linear-regression model with instrumental variables.

In one embodiment, the flight of the aircraft comprises distinct flight phases, which are governed by different laws depending on the flight segments along the trajectory: the performance of the method of least squares is advantageously improved if thrust and vertical-guidance information is taken into account.

Flight phases comprise in particular the phases of takeoff, climbing, cruising, level change and landing.

In one embodiment, the method comprises a step of determining an estimate, by means of least squares (or according to variants), of a model of aircraft performance, this estimate being made specifically in several "passes" of increasing complexity, each pass using i) a dataset enriched by a flight phase relative to the preceding pass; and ii) the result of the preceding pass as starting point (the first starting pass being made with a climb phase).

The invention may use predefined parametric models (i.e. use of equations).

Multiple models are possible. In the following description, two models (aerodynamic and engine) are described, these being necessary and sufficient to determine a performance model.

The models specified below advantageously combine realism with fast computing speed.

Aerodynamic Model

In one embodiment, the aerodynamics are modelled as follows:

$$C_D(C_L, M) = \sum_{i=0}^{2}\sum_{j=0}^{15} a_{i,j} C_L^i M^j \quad \text{[Math. 1]}$$

where $a_{i,j}$ represents coefficients or functions, $C_L$ (lift) and $C_D$ (drag) establish the link between lift, angle of attack and drag, and M (Mach) denotes the Mach number (which expresses the ratio of the local velocity of a fluid to the speed of sound in the same fluid). This model is generic.

Engine Model

In one embodiment, the engine speed is modelled by an affine function of type:

$$TSP = a \times z_p + b \times M + c \quad \text{[Math. 2]}$$

where TSP, a, b and c represent coefficients, $z_p$ denotes pressure according to altitude and M denotes the Mach number.

More generally, in other embodiments, engine speed is modelled by a polynomial function (with real or complex coefficients).

The engine manufacturer may have access to more complete equations; drag and thrust may in particular be functions (aerodynamic configuration).

FIG. 2 illustrates one example of parametric optimization according to the invention, in particular the steps of refining by successively adding flight phases.

In step 210 (which is a prior, offline, initialization step), the method according to the invention consists in segmenting each flight into a number n_phase of flight phases that can be modelled by a set E of predefined equations dependent on a number p_exp of explanatory variables and on a number n_par of parameters and providing an observation vector of size q_mes.

The explanatory variables take either continuous numerical values or discrete variables describing the various sub-processes followed by the modelled process.

In step 220, on the basis of a set of files 215 (from for example recordings of commercial flights, i.e. real data), an observation table is determined, which comprises a number m_obs of rows and p_exp+q_mes columns and contains the points associated with the climb phase of the aircraft.

In step 230, the method according to the invention comprises a step of determining (for example arbitrarily, but not always in order to accelerate the calculations) a number n_par of initial parameters, and of calculating the least-squares criterion of the table from step 220.

The least-squares criterion may be obtained as described below.

For each row of the table, the method determines, using the set E of equations defined in step 1, the m_obs components (Y1 ... Ym_obs) of the vector Y=E(X1, ... Xp_exp, P1, ... Pn_par). Next, the method determines the Euclidean norm N of the vector [Y−Yobs], the components of the vector Yobs being the m_obs last values in row i of the table. Lastly, the mean for N out of all of the rows in the table is calculated.

In the next step, the result thus obtained is delivered to a parameter optimization engine 240, which will deduce therefrom an iteration 242 of the n_par initial parameters and will repeat steps 230 and 240 until a minimality criterion 241 is satisfied, providing, at the end of this process, a set of n_par parameters, referred to as end or optimized parameters.

In step 250, steps 220, 230, and 240 are repeated according to predefined variations.

According to one variation, the observation table from step 220 contains the climb points and the descent points of the aircraft and the initial parameters from step 230 are the end parameters obtained in step 240.

According to another variation, steps 220, 230 and 240 are reiterated, in which the observation table in step 220 contains the climb points, the descent points and the cruise points of the aircraft, the initial parameters from step 230 being the end parameters obtained in step 240.

In one embodiment, the observation table comprises information relating to thrust mode and to vertical guidance.

The invention may be implemented on the basis of hardware and/or software elements. It may be available as a computer program product on a computer-readable medium.

In one variant embodiment, one or more steps of the method may be implemented within a ground computer.

Advantageously, if the computer is located on board an aircraft and is connected to a parameter recorder, flight data may be used in a real-time architecture to improve knowledge of aircraft performance in real time.

In one variant embodiment, one or more steps of the method according to the invention are implemented in the form of a computer program hosted on an EFB (electronic-flight-bag) portable computer. In one variant embodiment, one or more steps of the method may be implemented within an FMS (flight-management-system) computer or in an FM function of a flight computer.

What is described is a method for optimizing the flight of an aircraft, the flight of said aircraft being segmented into a number n_phase of flight phases that can be modelled by a set E of predefined equations dependent on a number p_exp of explanatory variables and on a number n_par of parameters and providing an observation vector of size q_mes, the method comprising the steps of: receiving a plurality of flight recordings and determining a table including a number m_obs of rows and p_exp+q_mes columns; determining a number n_par of parameters and calculating the least-squares criterion of the table thus determined; determining n_par parameters referred to as end parameters by iteration in a parameter-optimization engine until a predefined minimality criterion is satisfied.

The explanatory variables may be continuous numerical values and/or discrete variables describing the various sub-processes followed by the modelled process.

In one embodiment, the least-squares-calculation step comprises the steps of: —calculating, for each row of the table, using the set E of defined equations, the m_obs components (Y1 . . . Ym_obs) of the vector Y=E(X1, . . . Xp_exp, P1, . . . Pn_par), —determining the Euclidean norm N of the vector Y−Yobs, the components of the vector Yobs being the m_obs last values in row I of the table; and— determining the mean for N out of all of the rows in the table.

In one embodiment, the observation table comprises information relating to thrust mode and to vertical guidance. These data (full-throttle, idling, climbing, descending, etc.) are used as integrators (prediction).

In one embodiment, the aerodynamics are modelled by a model linking lift, angle of attack and drag, and M which denotes the Mach number. The Mach number expresses the ratio of the local velocity of a fluid to the speed of sound in the same fluid.

In one embodiment, the engine speed coupled with the aerodynamic model is modelled by a polynomial function.

In one embodiment, the initial parameters are the end parameters.

In one embodiment, the least-squares criterion is a recursive-least-squares criterion.

A description is given of a computer program product, said computer program comprising code instructions for performing one or more of the steps of the method when said program is executed on a computer.

What is described is a system for implementing one or more steps of the method, the system comprising one or more avionic systems.

In one embodiment, the calculations are performed on the ground.

In one embodiment, the system further comprises one or more non-avionic systems such as electronic flight bags (EFBs).

In one embodiment, the system comprises onboard computer and storage systems for processing aircraft performance in real time.

The invention claimed is:

1. A computer implemented method for determining an optimized aircraft performance model for a flight of an aircraft and adjusting an avionics system or a non-avionics system based on the optimized aircraft performance model, the flight of said aircraft being segmented into a number (n_phase) of flight phases, each phase being modelled by a set (E) of predefined equations dependent on a number (p_exp) of explanatory variables and on a number (n_par) of parameters and providing an observation vector of size (q_mes), the method comprising the steps of:
   (a) populating an observation table having a number (m_obs) of rows and a number (p_exp+q_mes) of columns, the observation table comprising one or more climb points of the aircraft and one or more level points of the aircraft and one or more descent points of the aircraft, wherein the observation table is determined based on recordings of real flight data;
   (b) determining for the parameters (n_par) a number of initial parameters;
   (c) calculating from the number of initial parameters, a least-squares criterion for the observation table, wherein the least-squares-calculation comprises the steps of:
      calculating, for each row of the table, using the set (E) of predefined equations, the (m_obs) components (Y1 . . . Ym_obs) of the vector (Y)=(E)(X1, . . . . Xp_exp, P1, . . . Pn_par);
      determining the Euclidean norm (N) of the vector (Y)−(Yobs), the components of the vector (Yobs) being the (m_obs) last values in row (I) of the table; and
      determining the mean for (N) out of all of the rows in the table;
   (d) using the calculated least-squares criterion in a parameter-optimization engine and repeating steps (b) and (c) until a predefined minimality criterion is satisfied, said minimality criterion satisfied for a number of the parameters (near) referred to as end parameters, said end parameters determining the optimized aircraft performance model; and
   (e) implementing the optimized aircraft performance model at the avionics system or at the non-avionics system to predict a flight trajectory of the aircraft or adjust the avionics system of the aircraft.

2. The method according to claim 1, the observation table comprising information relating to thrust mode and to vertical guidance.

3. The method according to claim 1, wherein determining the optimized aircraft performance model further comprising modeling aerodynamics using a model of type:

$$C_D(C_L, M) = \sum_{i=0}^{2} \sum_{j=0}^{N} a_{i,j} C_L^i M^j \qquad \text{[Math. 3]}$$

wherein ($a_{i,j}$) represents a coefficient or a function, ($C_L$) ("lift") et ($C_D$) ("drag") establish the link between lift, angle of attack and drag, and M denotes the Mach number.

4. The method according to claim 3, wherein an engine speed coupled with the aerodynamic model being modelled by a polynomial function.

5. The method according to claim 1, the initial parameters being the end parameters.

6. The method according to claim 1, the least-squares criterion being a recursive least-squares criterion.

7. A computer program product, said computer program comprising code instructions for performing the steps of the method according to claim 1 when said program is executed on a computer.

8. A system for implementing the steps of the method according to claim 1, the system comprising one or more avionic systems.

9. The system according to claim 8, the system further comprising one or more non-avionic systems comprising electronic flight bags (EFBs).

10. The system according to claim 8, comprising onboard computer and storage systems for processing aircraft performance in real time.

* * * * *

UNITED STATES PATENT AND TRADEMARK OFFICE
CERTIFICATE OF CORRECTION

| | |
|---|---|
| PATENT NO. | : 11,823,582 B2 |
| APPLICATION NO. | : 16/716198 |
| DATED | : November 21, 2023 |
| INVENTOR(S) | : Guillaume Meulle et al. |

It is certified that error appears in the above-identified patent and that said Letters Patent is hereby corrected as shown below:

In the Claims

In Claim 1, Column 6, Line 49, "the parameters (near) referred to" should be -- the parameters (n_par) referred to --.

Signed and Sealed this
Ninth Day of January, 2024

Katherine Kelly Vidal
*Director of the United States Patent and Trademark Office*